May 28, 1940.    C. M. LIND ET AL    2,202,562

CROSSED HELICAL FURNITURE TIE SPRING

Filed May 18, 1938

*Inventors:*
CARL M. LIND and
JOHN H. THOMAS.
by: *John E Jackson*
his Attorney.

Patented May 28, 1940

2,202,562

UNITED STATES PATENT OFFICE 2,202,562

CROSSED HELICAL FURNITURE TIE SPRING

Carl M. Lind, Waukegan, and John H. Thomas, North Chicago, Ill., assignors to The American Steel and Wire Company of New Jersey, a corporation of New Jersey Application May 18, 1938, Serial No. 208,676

1 Claim. (Cl. 5—269)

This invention is particularly concerned with the crossed helical springs used to tie together furniture springs, one of the objects being to provide for easy interfastening of the ends of the various springs without incidentally involving undue expense in the manufacture of the helical springs.

A specific assembly of the invention is shown in the accompanying drawing, in which.

Figure 1:
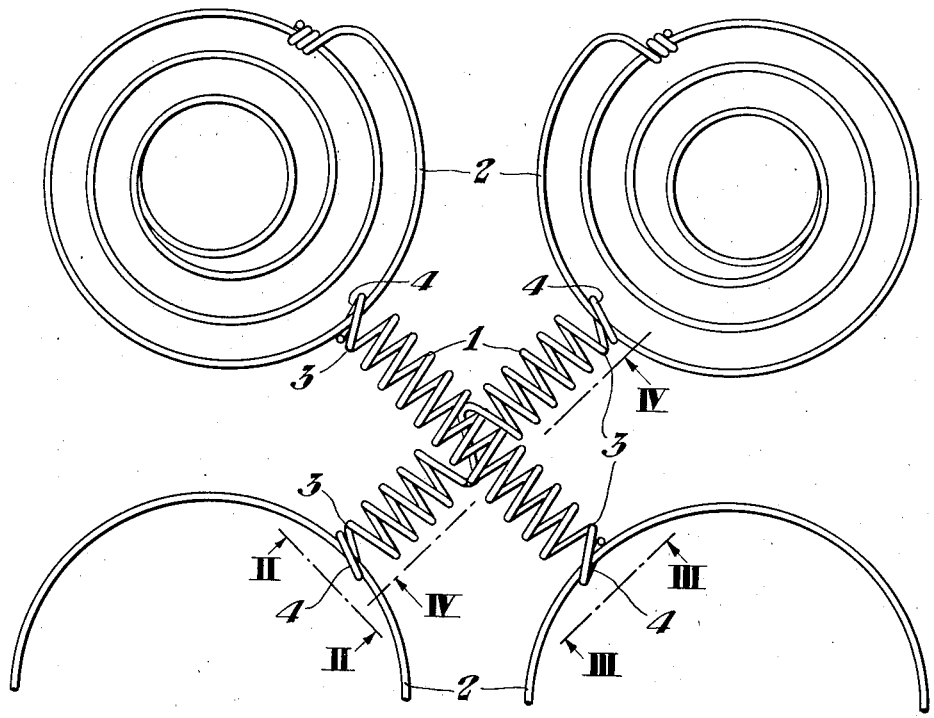
Figure 1 is a top view of the crossed helical springs in use.
Figure 2:
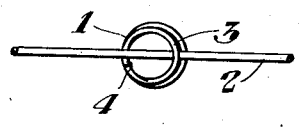
Figures 2 through 4 are views, respectively, taken from the lines II—II through IV—IV in Figure 1.
Figure 3:
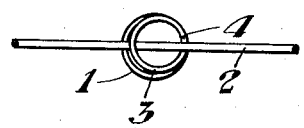
Figure 4:
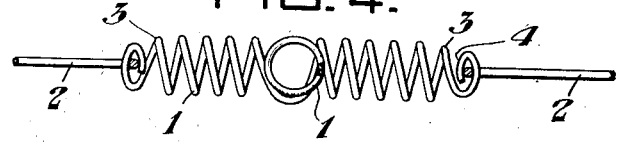

More specifically, the drawing shows crossed helical springs 1 tying together the adjacent ends of four spiral furniture springs 2. The helical springs are crossed by reason of one of the springs having a convolution spread intermediate its ends to provide a seat for the other spring. This arrangement is convenient and provides for very rapid spring assembly provided no difficulty is experienced in connection with interfastening the ends of the various springs.

According to the present invention, each of the helical springs is characterized by terminating at its opposite ends with convolutions 3 angling away from the others and having ends 4 adjacent their junctions with the latter. These convolutions 3 are of smaller diameter than the spring helix, and the ends 4 are spaced from the junctions of these convolutions 3 with the other convolutions, distances less than the diameter of the wire from which the springs 2 are made. In the case of each spring, the ends 4 point in approximately the same direction and are positioned in approximately the same plane.

To effect interfastening of the spring ends, the top convolution of one of the springs 2 is placed between one of the convolutions 3 and the next adjacent convolution of that one of the helical springs 1, with the end 4 pointing away from the convolution of the spring 2 in an approximately right angular direction. Forcing together of the top convolution of the spring 2 and the helical spring to be interfastened to the same causes displacement of the end 4 so that the wire forming the top convolution of this spring 2 may snap within the convolution 3, the end 4 snapping behind this wire and preventing releasal.

The same procedure is followed at the other end of the helical spring, and with all the other springs, during assembly of the furniture spring as a whole. It is unnecessary to turn any of the helical springs 1 to effect fastening of their ends with the ends of the springs 2. Due to the convolutions 3 being of smaller diameter than that of the spring helix, these convolutions will have greater effective stiffness than the helical convolutions when the helical springs are tensioned, whereby they cannot open up under normal spring tensioning.

We claim:

A helical spring for interfastening of furniture coil springs, characterized by terminating at its opposite ends with convolutions angling away from the others and having ends adjacent their junctions with the latter, said convolutions being of smaller diameter than the spring helix and said ends being spaced from said junctions distances less than the diameter of the wire from which the furniture springs to be interfastened are made, said ends of said convolutions pointing in approximately the same directions and said convolutions angling respecting the others to provide converging passages leading to the spaces between said ends and said junctions to provide for a wedging action when said helical spring is forced against a furniture spring in a direction opposite the pointing directions of said ends.

CARL M. LIND.
JOHN H. THOMAS.